(12) United States Patent
Kopp

(10) Patent No.: US 7,694,572 B2
(45) Date of Patent: Apr. 13, 2010

(54) PRESSURE-MEASURING DEVICE

(75) Inventor: Thomas Kopp, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 56 days.

(21) Appl. No.: 12/222,890

(22) Filed: Aug. 19, 2008

(65) Prior Publication Data

US 2009/0049922 A1 Feb. 26, 2009

Related U.S. Application Data

(60) Provisional application No. 60/935,907, filed on Sep. 6, 2007.

(30) Foreign Application Priority Data

Aug. 20, 2007 (DE) ........................ 10 2007 039 297

(51) Int. Cl.
*G01L 19/04* (2006.01)
(52) U.S. Cl. ........................................................ 73/708
(58) Field of Classification Search ........................ None
See application file for complete search history.

(56) References Cited

U.S. PATENT DOCUMENTS 4,322,775 A * 3/1982 Delatorre ................. 361/283.4
4,726,232 A * 2/1988 Koneval ....................... 73/708
6,205,861 B1 * 3/2001 Lee ............................. 73/724
6,374,680 B1 * 4/2002 Drewes et al. ................ 73/718
7,000,482 B2 * 2/2006 Mei ............................. 73/718
7,043,994 B2 * 5/2006 Mei ............................. 73/708
7,395,716 B2 * 7/2008 Mei ............................. 73/724
7,454,975 B2 * 11/2008 Louwagie et al. ............. 73/715

FOREIGN PATENT DOCUMENTS

| DE | 42 34 289 C1 | 11/1993 |
| DE | 42 19 177 A1 | 12/1993 |
| DE | 44 16 978 A1 | 11/1995 |
| DE | 196 28 551 A1 | 2/1997 |

* cited by examiner

*Primary Examiner*—Lisa M Caputo
*Assistant Examiner*—Jermaine Jenkins
(74) *Attorney, Agent, or Firm*—The Nath Law Group; Jerald L. Meyer; Derek Richmond

(57) ABSTRACT

A pressure-measuring device has an initial pressure-measuring cell (1') with a first thermal expansion coefficient ($\alpha 1$), a first housing (1), which is surrounded circumferentially by a second housing (1) having a second thermal expansion coefficient ($\alpha 2$) which is greater than the first thermal expansion coefficient ($\alpha 1$), and an O-ring, which is positioned between the pressure-measuring cell (1') and the second housing (2), such that a third housing (3) is provided which circumferentially encloses both the pressure-measuring cell (1') and the second housing, (2) and which has a third thermal expansion coefficient ($\alpha 3$) that is less than or equal to the first thermal expansion coefficient ($\alpha 1$).

9 Claims, 1 Drawing Sheet

PRESSURE-MEASURING DEVICE

Figure 1:
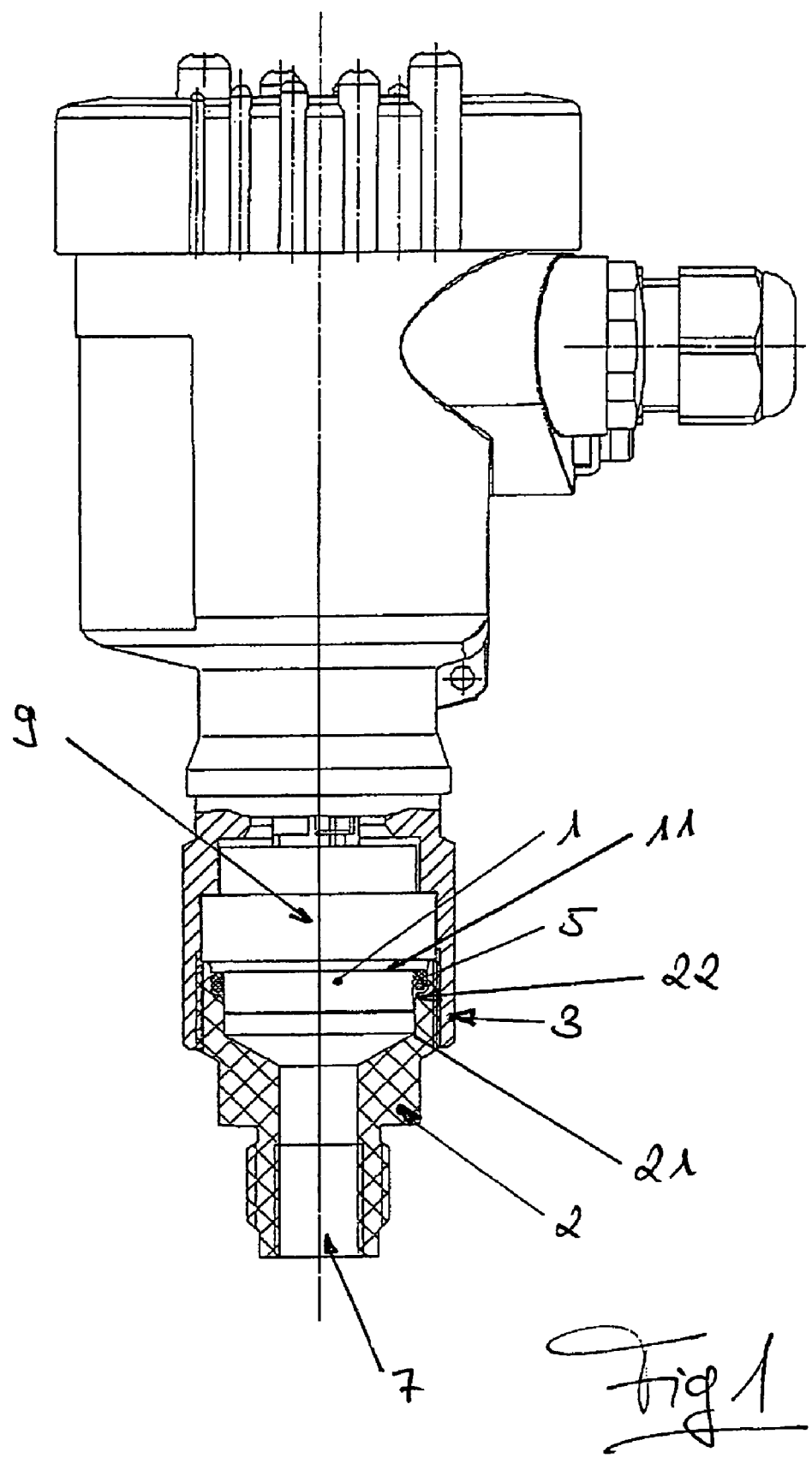

The invention relates to a pressure-measuring device with the features indicated in the preamble of patent claim 1.

Known to the prior art are measuring devices in which a pressure-measuring cell is positioned in a second housing, which consists of a chemically resistant polymer and which surrounds the pressure-measuring cell. An O-ring is furnished between the pressure-measuring cell and the second housing of chemically resistant polymer, in order to provide a seal for the processes attachments that are positioned at the back side. Since the pressure-measuring cell, which may consist of metal or ceramic, has a lower coefficient of thermal expansion than the housing of chemically resistant polymer which surrounds it, a problem arises in that the sealing effect of the O-ring located between the pressure-measuring cell and the second housing may abate as a function of temperature, or may be completely lost. Since at higher temperatures the plastic housing expands more severely than the pressure-measuring cell positioned inside it, the effect produced by the O-ring is lost and the gap lying in-between is no longer sufficient sealed.

Known from the prior art is DE 42 34 289 C1, which solves this problem by specifying that a metal ring is molded into the chemically resistant plastic housing, such that the metal ring arrests the thermal expansion of the polymer housing or, as the case may be, the thermal expansion of the molded metal ring is restricted. However, the procedure known from DE 42 34 289 C1 has a disadvantage in that the manufacturing process involves injection molding and is only profitable in large-scale production, and in that the application of the supporting ring—e.g., through machining of the plastic housing—is very expensive.

The goal of the invention is to provide a pressure-measuring device which guarantees a highly effective seal, even when there are large temperature fluctuations, and which can be produced easily and economically.

This goal is achieved in a pressure-measuring device with the features of patent claim 1.

A pressure-measuring device according to the invention has a pressure-measuring device with an initial coefficient of thermal expansion, a second housing which circumferentially surrounds the pressure-measuring cell and has a second thermal expansion coefficient which is greater than the first thermal expansion coefficient, and an O-ring positioned between the pressure-measuring cell and the second housing, such that a third housing is provided which circumferentially surrounds both the pressure-measuring cell and the second housing, and which has a third thermal expansion coefficient that is less than or equal to the first thermal expansion coefficient. The advantage of this kind of design rests in the fact that thermal expansion of the second housing in the radial direction can be suppressed in a simple fashion when the third housing is circumferentially positioned outside of the second housing.

It is particularly advantageous when the second and third housing are designed in tubular fashion and when the pressure-measuring cell and the third housing are made of metal or ceramic and the second housing is made of a chemically resistant plastic. An advantageous arrangement results when the second housing runs along the front side and terminates at the back side with the pressure-measuring cell, and when the third housing runs toward the back and terminates on the front side with the pressure-measuring cell. The advantage of such a design is that a measuring attachment can be realized on the front side with a chemically resistant plastic and a backside process connection can be produced in a simple manner from resistant metal.

It is advantageous if the pressure-measuring cell is positioned inside of the second housing and the second housing is screwed into the third housing. With this kind of design, the pressure-measuring device according to the invention can be assembled with special ease and consequently can be manufactured inexpensively. It is also conceivable for the third housing to be screwed on to the second housing simply in the form of a ring. This alternative also affords the advantages provided by the invention.

The invention is next described in greater detail on the basis of an exemplary embodiment and with reference to the attached FIGURE.

Shown is:

FIG. 1 an exemplary embodiment of the pressure-measuring device according to the invention.

FIG. 1 shows a pressure-measuring device according to the invention, with a pressure measuring cell 1' and a first housing 1, such that the pressure cell is positioned in a second housing 2, which runs along the front side. The second housing 2 is tubular in design and in the area around the pressure-measuring cell 1' has a circumferential recess in which the capsule-shaped pressure-measuring cell 1' is positioned. At same the level as the back end 11 of the pressure-measuring cell 1' the second housing 2 has another circumferential recess, which is suited for receiving an O-ring 5. The pressure-measuring cell 1' and the second housing 2 are designed in such a way that the O-ring is caught in a gap formed by the second recess 22, with the result that a rearward area around the pressure-measuring cell is sealed against the forward measuring attachment 7. Positioned at the back is a third housing 3, which circumferentially grips the second housing 2, as well as the first housing 1 and the pressure-measuring device 1. This third housing 3 passes into a rearwards process attachment 9. The third housing 3 has a tubular design and has an inner thread toward the front, which is designed so that the second housing 2 can be screwed into the third housing 3 by means of an outer thread. Given a suitable selection of materials for producing the different housing parts and the pressure-measuring cell 1', it is possible to realize the advantages afforded by the invention. The pressure-measuring cell is typically manufactured from a metal material. For technical reasons it is frequently necessary to manufacture the second housing 2, which forms the front measuring attachment 7, out of a chemically resistant plastic. However, the chemically resistant plastic, e.g., a polymer, has a thermal expansion coefficient $\alpha 2$ which is greater than the thermal expansion coefficient $\alpha 1$ of the pressure-measuring cell 1'. Due to this fact, at high temperatures the second housing 2 expands radially to a greater degree than the pressure-measuring cell 1', with the result that the gripping effect on the O-ring abates. This effect is counteracted by the third housing 3, which is screwed on from the back to cover the second housing 2. The third housing 3 is made of a material exhibiting a third thermal expansion coefficient $\alpha 3$. The third thermal expansion coefficient $\alpha 3$ is comparable to the first thermal expansion coefficient $\alpha 1$ and ideally is equal to or less than it. This choice of materials assures that with the third housing 3 the thermal expansion of the second housing 2 is counteracted in the radial direction, so that the clamping effect on the O-ring 5 is not lost.

It should be noted here that the choice of materials for the pressure-measuring cell 1' and the third housing 3 is not restricted to identical materials, but that materials with comparable coefficients of thermal expansion are advantageous.

LIST OF REFERENCE NUMERALS 1 first housing
1' pressure-measuring cell
2 second housing
5 O-ring
7 measuring attachment
9 process attachment
21 first recess
22 second recess
α1 first coefficient of thermal expansion
α2 second coefficient of thermal expansion
α3 third coefficient of thermal expansion

The invention claimed is:

1. Pressure-measuring device, with
a pressure-measuring cell (1') which has a first coefficient of thermal expansion ($\alpha 1$),
a second housing (2) which surrounds the pressure-measuring cell (1') in circumferential fashion and which has a second coefficient of thermal expansion ($\alpha 2$) which is greater than that the first coefficient of thermal expansion ($\alpha 1$), and
an O-ring (5) which is positioned between the pressure-measuring cell (1') and the second housing (2), wherein
a third housing (3) is provided which surrounds both the pressure-measuring cell (1') and the second housing (2) circumferentially and which has a third coefficient of thermal expansion ($\alpha 3$) smaller than or equal to the first coefficient of thermal expansion ($\alpha 1$).

2. Pressure-measuring cell according to claim 1, wherein
the second housing (2) and the third housing (3) are tubular in design.

3. Pressure-measuring cell according to claim 1, wherein
the pressure-measuring cell (1') and the third housing (3) are manufactured from materials having comparable expansion properties, such as metal.

4. Pressure-measuring cell according to claim 1, wherein
the second housing (2) is manufactured from a chemically resistant plastic.

5. Pressure-measuring cell according to claim 1, wherein
the second housing (2) runs along the front and terminates at the back with the pressure-measuring cell (1').

6. Pressure-measuring cell according to claim 1, wherein
the third housing (3) runs along the back and terminates at the front with the pressure-measuring cell (1').

7. Pressure-measuring cell according to claim 1, wherein
the third housing (3) is circular in design.

8. Pressure-measuring cell according to claim 1, wherein
the pressure-measuring cell (1') is positioned inside of the second housing (2) and the second housing (2) is screwed into the third housing (3).

9. Pressure-measuring cell according to claim 1, wherein
the second housing (2) has a circular recess or a circular groove for receiving the O-ring (5).

* * * * *